United States Patent Office 3,092,964
Patented June 11, 1963

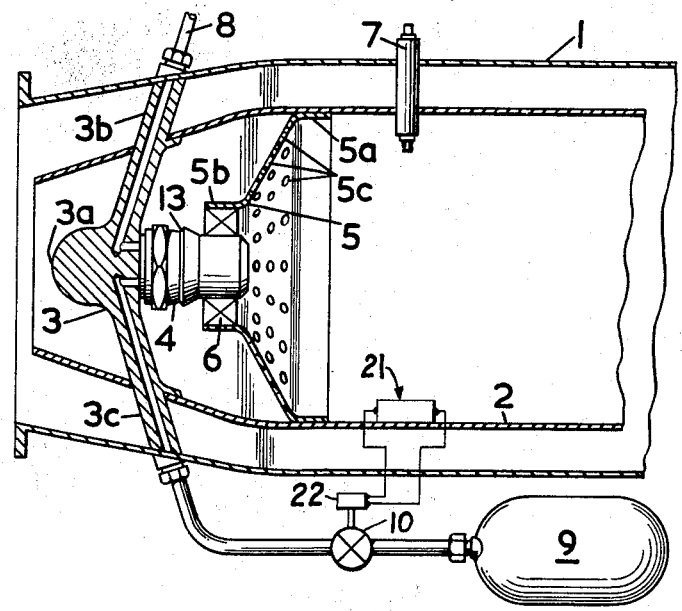
FIG. 1.
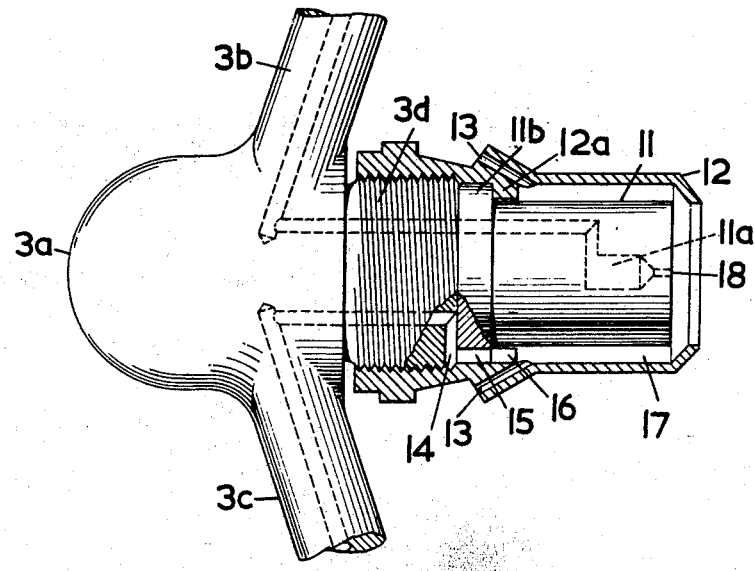
FIG. 2.
PETER MARTIN
JAMES ALAN BAMFORD
Inventors
By 
Attorney This invention relates to a method of initiating or maintaining combustion of fuel in a combustion chamber and to apparatus for carrying out such a method. The invention is thought to be particularly though not necessarily exclusively applicable to the combustion of fuel in the combustion chambers of aircraft gas turbine and ram jet engines under conditions in which ignition is uncertain or impossible or in which it is difficult to maintain combustion. Such conditions may arise at high altitude where the range of stability of combustion is limited and manoeuvering the aircraft may cause flame extinction, and where, if combustion ceases, it may be impossible to restart the engine.

3,092,964
METHOD OF RELIGHTING IN COMBUSTION
CHAMBERS
Peter Martin, Bentley, near Farnham, and James A. Bamford, Crookham, near Aldershot, England, assignors to Her Majesty's Government of the United Kingdom of Great Britain and Northern Ireland as represented by the Minister of Supply, London, England
Filed Mar. 30, 1955, Ser. No. 497,861
Claims priority, application Great Britain Mar. 30, 1954
2 Claims. (Cl. 60—39.09)

The difficulty in initiating and maintaining combustion at altitude arises at least partly from the small quantity of oxygen in the air available. Accordingly the present invention provides a method of initiating or maintaining combustion in a combustion chamber in which a quantity of gaseous oxygen is supplied to the combustion chamber in the region thereof where the fuel is introduced.

In order to carry this method into effect, the invention provides combustion apparatus comprising a combustion chamber, a fuel injector arranged to inject fuel into the combustion chamber, an igniter located in the combustion zone of the combustion chamber, and means for introducing oxygen into the chamber in the immediate vicinity of the discharge nozzle of the injector.

In a preferred form of the invention, the fuel injector has a body having its discharge nozzle in its end face and enclosed by an annular passage opening into the combustion chamber around the nozzle, and the oxygen is introduced into this passage.

The invention may be applied to a conventional gas turbine combustion chamber comprising an aircasing, a flame tube enclosed thereby and a fuel injector disposed to inject fuel into one end of the flame tube. The injector is enclosed by a shroud forming therewith an annular passage which is open at the upstream end to receive a stream of air and at the downstream end to discharge the stream over the face of the injector. The oxygen is introduced into the passage and is entrained by the stream of air passing therethrough, and is thereby led into the region of the combustion chamber where the fuel is introduced in the immediate vicinity of the injector, thereby being brought into initimate contact with fuel as it emerges from the discharge nozzle of the injector.

A particular embodiment of the invention will now be described with reference to the accompanying drawings, of which:

FIGURE 1 is a sectional view of the upstream end of an aircraft gas turbine combustion chamber.

FIGURE 2 is a part sectional view of a detail of the combustion chamber shown in FIGURE 1.

The combustion chamber illustrated is one of a number installed in an aircraft gas turbine plant of known type comprising a compressor supplying compressed air to a combustion system and a turbine receiving combustion gases from the combustion system and driving the compressor. The combustion system comprises a number of combustion chambers of the type shown in the drawings, each of which is supplied with fuel from an engine driven fuel pump. Any normal aircraft gas turbine fuel, e.g. kerosene, may be used.

Referring now to FIGURE 1, the combustion chamber comprises a tubular aircasing 1 and a flame tube 2 enclosed thereby. The aircasing is provided with an end flange for attachment to the outlet of the compressor supplying compressed air to the combustion chamber, while the downstream end of the combustion chamber (not shown) is connected to discharge hot combustion gases into the turbine. The flame tube is carried in the aircasing 1 on a support 3 comprising a central boss 3a and two streamlined arms 3b, 3c extending radially therefrom and secured at their ends to the wall of the aircasing 1. A fuel injector 4 is carried on the downstream side of the boss 3a. A frusto-conical member 5 is carried within the flame tube 1, which member has a peripheral flange 5a secured to the flame tube wall, and a central tubular portion 5b around the injector 4, and is formed with a large number of small holes 5c. A ring of swirler vanes 6 is provided in the space between the tubular portion 5b and the injector 4. The combustion chamber is further provided with a sparking plug 7.

In operation, some of the air entering the flame tube 2 through the inlet constituted by its open upstream end passes through the swirl vanes 6 and some passes through the holes 5c in the frusto-conical member 5. This member constitutes a flame stabilising baffle and gives rise to a stabilised combustion zone on its downstream side. Under normal conditions the fuel injected by the injector 4 is ignited by the sparking plug 7 and burns stably in the stabilised combustion zone, the quantity of air supplied by the compressor being sufficient to support combustion.

Referring now to FIGURE 2, the boss 3a is provided with an externally threaded cylindrical extension 3d on its rear face, against which the nozzle body 11 of the injector 4 abuts. This nozzle body may be of any known type; for example as shown diagrammatically in the drawing it may be formed internally with a swirl or vortex chamber 11a leading to an axial discharge nozzle 18 in the end face of the injector. The vortex chamber 11a has one or more tangential inlets connected by drillings in the nozzle body 11, the cylindrical extension 3d and the arm 3b of the support 3 to a fuel supply connection 8 on the outside of the aircasing which leads from the engine-driven fuel pump.

The nozzle body 11 is held in position by means of an enclosing casing 12 which has an internal shoulder 12a bearing against a flange 11b on the nozzle body 11 and which screws onto the threaded cylindrical extension 3d. The casing is spaced from the nozzle body for part of its length and constitutes an annular shroud. A small portion of the air entering the flame tube is led through apertures 13 in the casing into the passage 17 so formed. The rearward end of the casing has an inturned end wall so that the air discharged from the space 17 is deflected over the face of the burner towards the nozzle 18 thus tending to prevent the deposit of unburnt carbon thereon.

The arm 3c of the flame tube support is also provided with an internal drilling connected to an oxygen storage vessel such as an oxygen cylinder 9 through a valve 10. The drilling connects with a further drilling in the cylindrical extension 3d leading into a radially extending slot 14 in the face thereof. This slot registers with a slot 15 in the flange 11b which in turn registers with a gap 16 in the shoulder 12a. Oxygen can be led through the drillings and the slots 14, 15, 16 into the annular passage 17 between the casing and the nozzle body.

If combustion ceases at high altitudes, the engine will continue to windmill around, and there will still be a high speed air flow through the combustion chambers. The engine-driven pump will also continue to deliver fuel to the combustion chambers but it may be impossible to relight the fuel due to the reduced air pressure and to the small quantity of oxygen available. Due to the forward motion of the aircraft and to the windmilling of the engine, there will be a comparatively small mass flow of air through the combustion chamber and in particular through the annular passage 17. To relight, the valve 10 is opened so that oxygen is supplied to the passage 17 within the shroud 12 and at the same time the sparking plug 7 is energised. The oxygen mixes with the air flowing through passage 17 and is carried thereby into the immediate vicinity of the nozzle. The region where the fuel is injected is thereby enriched with oxygen which is led into intimate contact with the fuel so that ignition can be effected by means of the sparking plug 7. When combustion becomes self-sustaining, the oxygen supply can be turned off.

The sparking plug 7 is normally required to operate on starting only, and accordingly the valve 10 may be so operatively connected to the ignition circuit that when the valve 10 is opened the plug 7 is energised, and when the valve is closed the ignition circuit is broken. The valve 10 and the ignition switch may be operable by a single control lever. In some circumstances however the oxygen supply must be maintained for some considerable period until the engine has speeded up sufficiently for combustion to become self-sustaining even though it may not be necessary to operate the sparking plug any longer. In this case, independent controls for turning off the oxygen supply and breaking the ignition circuit are required.

Provision may also be made for automatically turning on the oxygen supply if the flame is extinguished. For example a device responsive to a conditon indicating flame extinction, e.g. temperature or pressure, such as aneroid 21 may bet installed in the combustion chamber, so that, if the flame is extinguished the device will actuate motor 22 of a servo-system or the like to open the oxygen valve 10. Such a device may be adapted to close the ignition switch as well. Similarly, an automatic control, responsive, for example, to engine speed or to temperature in some selected part of the engine may be provided to turn off the oxygen supply when the combustion becomes self-sustaining.

Oxygen may also be supplied to the combustion chamber for improving the stability of combustion under conditions when flame extinction is likely to occur, e.g. manoeuvering at high altitudes. The valve 10 may therefore also be operable by an aneroid capsule which is set so that below a predetermined ambient pressure, the oxygen supply is turned on. The mass flow of oxygen required under these conditions will be less than that required for relighting. As before the ignition switch may also be connected for simultaneous operation with the valve 10.

The invention may be used in gas turbine plant of any known type, e.g. with a number of separate combustion chambers of the type described, or with a number of separate flame tubes enclosed by a single annular aircasing, or with a fully annular combustion chamber. In the first two types referred to above, it is usual for only one or two of the flame tubes to be provided with igniters, the flame being spread from one to another through interconnecting passages. In the same way, provision may be made for supplying oxygen only to those flame tubes having igniters.

The invention may be used in conjunction with fuel injectors of the vaporiser type as well as atomiser type as shown.

The invention may also be applied to jet propulsion plant of the ram jet or propulsive duct type.

We claim:

1. In a gas turbine or ram jet engine, a combustion chamber defining a combustion zone and having an air inlet and an outlet for combustion gases; a fuel injector comprising a body having a discharge nozzle in its end face arranged to inject fuel into said combustion chamber and a shroud enclosing said body and defining therewith an annular passage opening into said combustion chamber around said nozzle, means to admit air into said annular passage, means to introduce oxygen into said annular passage and means located in said combustion chamber responsive to a condition indicating flame extinction and operatively connected to said second mentioned means whereby the flow of oxygen may be automatically initiated and air and oxygen are mixed in said annular passage before being ejected around said nozzle.

2. In a gas turbine or ram jet engine, a combustion chamber defining a combustion zone and having an air inlet and an outlet for combustion gases; a fuel injector arranged to inject fuel into said combustion zone of said combustion chamber; means for supplying gaseous oxygen to said combustion chamber in the immediate vicinity of said fuel injector: and means located in said combustion chamber responsive to a condition indicating flame extinction in said combustion chamber and operatively connected to said means to supply oxygen so that said last mentioned means is turned on when the flame is extinguished.

References Cited in the file of this patent

UNITED STATES PATENTS

| | | |
|---|---|---|
| 2,590,009 | Hannum | Mar. 18, 1952 |
| 2,628,473 | Frye | Feb. 17, 1953 |
| 2,651,173 | Thwaites et al. | Sept. 8, 1953 |
| 2,689,452 | Jordan | Sept. 21, 1954 |
| 2,715,813 | Holmes et al. | Aug. 23, 1955 |
| 2,741,090 | Johnson | Apr. 10, 1956 |

FOREIGN PATENTS

| | | |
|---|---|---|
| 685,068 | Great Britain | Dec. 31, 1952 |